US 9,274,585 B2

(12) United States Patent
Breternitz et al.

(10) Patent No.: US 9,274,585 B2
(45) Date of Patent: Mar. 1, 2016

(54) COMBINED DYNAMIC AND STATIC POWER AND PERFORMANCE OPTIMIZATION ON DATA CENTERS

(71) Applicants: Mauricio Breternitz, Austin, TX (US); Leonardo Piga, Austin, TX (US); Patryk Kaminski, Austin, TX (US)

(72) Inventors: Mauricio Breternitz, Austin, TX (US); Leonardo Piga, Austin, TX (US); Patryk Kaminski, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 260 days.

(21) Appl. No.: 13/917,417

(22) Filed: Jun. 13, 2013

(65) Prior Publication Data

US 2014/0372782 A1 Dec. 18, 2014

(51) Int. Cl.
G06F 1/32 (2006.01)
(52) U.S. Cl.
CPC ............. *G06F 1/3206* (2013.01); *G06F 1/324* (2013.01); *G06F 1/3296* (2013.01)
(58) Field of Classification Search
CPC .............................. G06F 1/329; G06F 9/5094
USPC .......................................................... 713/340
See application file for complete search history.

(56) References Cited

U.S. PATENT DOCUMENTS

| | | | |
|---|---|---|---|
| 7,272,517 B1* | 9/2007 | Brey et al. | 702/60 |
| 8,489,904 B2* | 7/2013 | Boyd et al. | 713/320 |
| 2008/0209445 A1* | 8/2008 | Iyengar et al. | 719/320 |
| 2009/0138219 A1* | 5/2009 | Bletsch et al. | 702/60 |
| 2010/0064162 A1* | 3/2010 | Rotem et al. | 713/340 |
| 2011/0022870 A1* | 1/2011 | McGrane et al. | 713/340 |
| 2012/0066526 A1* | 3/2012 | Salsbery et al. | 713/320 |
| 2013/0103968 A1* | 4/2013 | Conroy et al. | 713/340 |
| 2013/0139170 A1* | 5/2013 | Prabhakar et al. | 718/104 |
| 2014/0108828 A1* | 4/2014 | Breternitz et al. | 713/300 |
| 2014/0215241 A1* | 7/2014 | Yoon et al. | 713/322 |
| 2014/0359633 A1* | 12/2014 | Breternitz et al. | 718/104 |

OTHER PUBLICATIONS

N. Yigitbasi et al.; *Energy Efficient Scheduling of MapReduce Workloads on Heterogeneous Clusters*, GCM '11 Proceedings of $2^{nd}$ International Workshop on Green Computing Middleware; Dec. 12, 2011; pp. 1-6.

R. Bergamaschi et al.; *Modeling, Simulation and Optimization of Power and Performance of Data Centers*; MOBS 7—Seventh Annual Workshop on Modeling, Benchmarking and Simulation; 2011; pp. 1-6.

Barroso et al.; *The Case for Energy-Proportional Computing*; IEEE Computer 40 (12); Dec. 2007; pp. 33-37.

(Continued)

*Primary Examiner* — Vincent Tran
(74) *Attorney, Agent, or Firm* — Timothy M. Honeycutt (57) ABSTRACT

Various datacenter or other computing center control apparatus and methods are disclosed. In one aspect, a method of computing is provided that includes defining plural processor performance bins where each processor performance bin has a processor performance state. At least one processor is assigned to each of the plural processor performance bins. Processor performance metrics of at least one of the processors are monitored while the at least one of the processors executes an incoming task. Processor power is modeled based on the monitored performance metrics. Future incoming tasks are assigned to one of the processor performance bins based on the modeled processor power.

17 Claims, 4 Drawing Sheets

(56) References Cited

OTHER PUBLICATIONS

Fan et al.; *Power provisioning for a Warehouse-sized Computer*; ISCA 2007; Proceedings of the 34th Annual International Symposium on Computer architecture; ACM, New York, NY, USA; Jun. 9-13, 2007; pp. 13-23.

Piga et al.; *Empirical Web server power modeling and characterization*; Proceedings of the 2011 IEEE International Symposium on Workload Characterization; 2011; pp. 1-10.

* cited by examiner

COMBINED DYNAMIC AND STATIC POWER AND PERFORMANCE OPTIMIZATION ON DATA CENTERS

BACKGROUND OF THE INVENTION

1. Field of the Invention

This invention relates generally to semiconductor processing, and more particularly to methods and apparatus for controlling the behavior of multiple processors in a distributed computing system.

2. Description of the Related Art

Explosive growth in data center construction has fueled a need for energy consumption awareness, both from the perspective of server power and data center cooling power. Modern servers routinely contain multiple processors and data centers scores or hundreds of servers. Spread out over hundreds of servers, processor power consumption can be enormous. Large numbers of servers and processors dissipate heat and require significant amounts of chilled air to both avoid thermal performance or shutdown issues and to operate at more electrically efficient temperatures. The power consumed by servers directly affects the power required by auxiliary equipment and cooling. Thus, server power conservation translates into overall data center power savings.

Central processing units (CPUs) are organized as nodes with multiple nodes combined into a cluster. One existing solution to increase power consumption efficient utilizes a local algorithm(s) that attempts to maximize power efficiency utilizing information from the processing node. These solutions that rely solely on the local governor provided by the CPU vendor are consequently local to a node and not necessarily related to the cluster workload.

Another prior solution utilizes heterogeneous clusters composed of processors having distinct power and performance characteristics. These approaches use rough heuristics to direct workloads to the processors with the expected best match. Such approaches are static in nature, since the cluster configuration is static, and do not take dynamic workload execution characteristics into consideration. Other previous solutions override the local CPU governor and control the power states globally. Due to the global nature, these solutions are less likely to be able to react quickly to local changes in the power demands.

Modern processors feature Dynamic Voltage and Frequency Scaling (DVFS). Power-aware optimizations make use of this feature to trade-off power and performance. Each voltage and frequency operating point represents a power-saving state of the processor. There are multiple levels of power conservation, the deeper the state the higher the savings, though with an increasing time penalty for state switching. Such processors are equipped with the aforementioned local governors that react to microarchitectural utilization parameters and control processor power states. Such governors are able to react quickly to changing architectural demands, however the decision process is made utilizing only local information.

Another prior solution involves asymmetric clusters consisting of nodes of varying computation capabilities, and corresponding power envelopes. One cluster is composed of power-efficient and lower-performance Atom processors, and more high-performance (and power-hungry) Sandy Bridge processors. This technique utilizes a heuristic to classify each task as either CPU-bound or I/O-bound. CPU-bound tasks are scheduled to high-performance (and thus higher power consumption) processors, whereas I/O tasks are scheduled to the lower-performance (lower power consumption) nodes.

The present invention is directed to overcoming or reducing the effects of one or more of the foregoing disadvantages.

SUMMARY OF EMBODIMENTS OF THE INVENTION

In accordance with one aspect of an embodiment of the present invention, a method of computing is provided that includes defining plural processor performance bins where each processor performance bin has a processor performance state. At least one processor is assigned to each of the plural processor performance bins. Processor performance metrics of at least one of the processors are monitored while the at least one of the processors executes an incoming task. Processor power is modeled based on the monitored performance metrics. Future incoming tasks are assigned to one of the processor performance bins based on the modeled processor power.

In accordance with another aspect of an embodiment of the present invention, a method of computing is provided that includes receiving at a remote computing system an incoming task from a local computing device. The remote computing system has plural processors and plural defined processor performance bins. Each processor performance bin has a processor performance state and at least one processor is assigned to each of the plural processor performance bins. Processor performance metrics of at least one of the processors are monitored while the at least one of the processor executes the incoming task. Processor power is modeled based at least in part on the monitored performance metrics. Future incoming tasks are assigned to one of the processor performance bins based at least in part on the modeled processor power.

In accordance with another aspect of an embodiment of the present invention, a computing system is provided that includes a decision device operable to define plural processor performance bins where each processor performance bin corresponds to one of multiple processor performance states. Plural processors are coupled to the decision device. Each processor has the multiple processor performance states. The system includes instructions in a computer readable medium for assigning at least one processor to each of the plural processor performance bins, monitoring processor performance metrics of at least one of the processors while the at least one of the processors executes an incoming task and model processor power based on the monitored performance metrics, and assigning future incoming tasks to one of the processor performance bins based on the modeled processor power.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Various apparatus and methods for distributing computing workloads among multiple processors of, for example, a datacenter cluster are disclosed. In one variant, a decision device, such as a server or computer, defines plural processor performance bins where each processor performance bin has a processor performance state. At least one processor is assigned to each of the plural processor performance bins. Processor performance metrics of at least one of the processors are monitored while the at least one of the processors executes an incoming task. Processor power is modeled based on the monitored performance metrics. Future incoming tasks are assigned to one of the processor performance bins based on the modeled processor power. Additional details will now be described.

Figure 1:
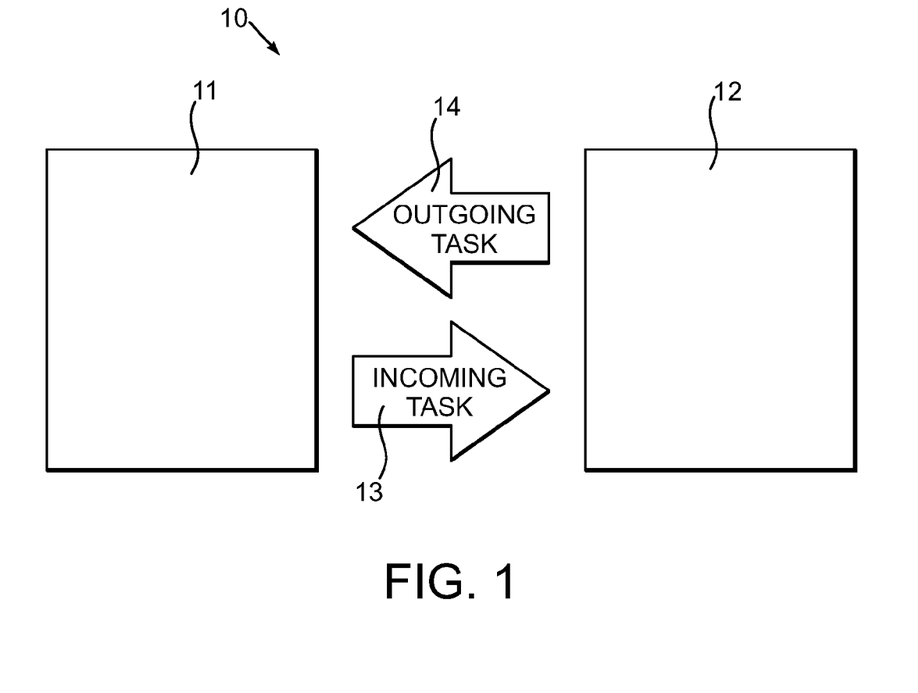
FIG. 1 is a schematic view of an exemplary embodiment of a distributed computing system that includes a computing device connected to a remote computing system.

In the drawings described below, reference numerals are generally repeated where identical elements appear in more than one figure. Turning now to the drawings, and in particular to FIG. 1, therein is shown a schematic view of an exemplary embodiment of a distributed computing system 10 that includes a computing device 11 connected to a remote computing system 12. The computing device 11 may be a computer, a smart television, a handheld mobile device, a server or any other computing device. The remote computing system 12 may be a server, data center or other remote computing system. The computing device 11 is operable to generate an incoming task 13 that is delivered to the remote computing system 12. Examples are legion and include a call to open a particular web page, play a media file, store a file remotely or other operation. In response to the incoming task 13, the remote computing system 12 is operable to generate an outgoing task 14. Again, examples are numerous, such as opening a web page, a media file or other operation. In the ordinary course of internet communications, for example, such incoming task(s) 13 and outgoing task(s) 14 may occur in large numbers.

Figure 2:
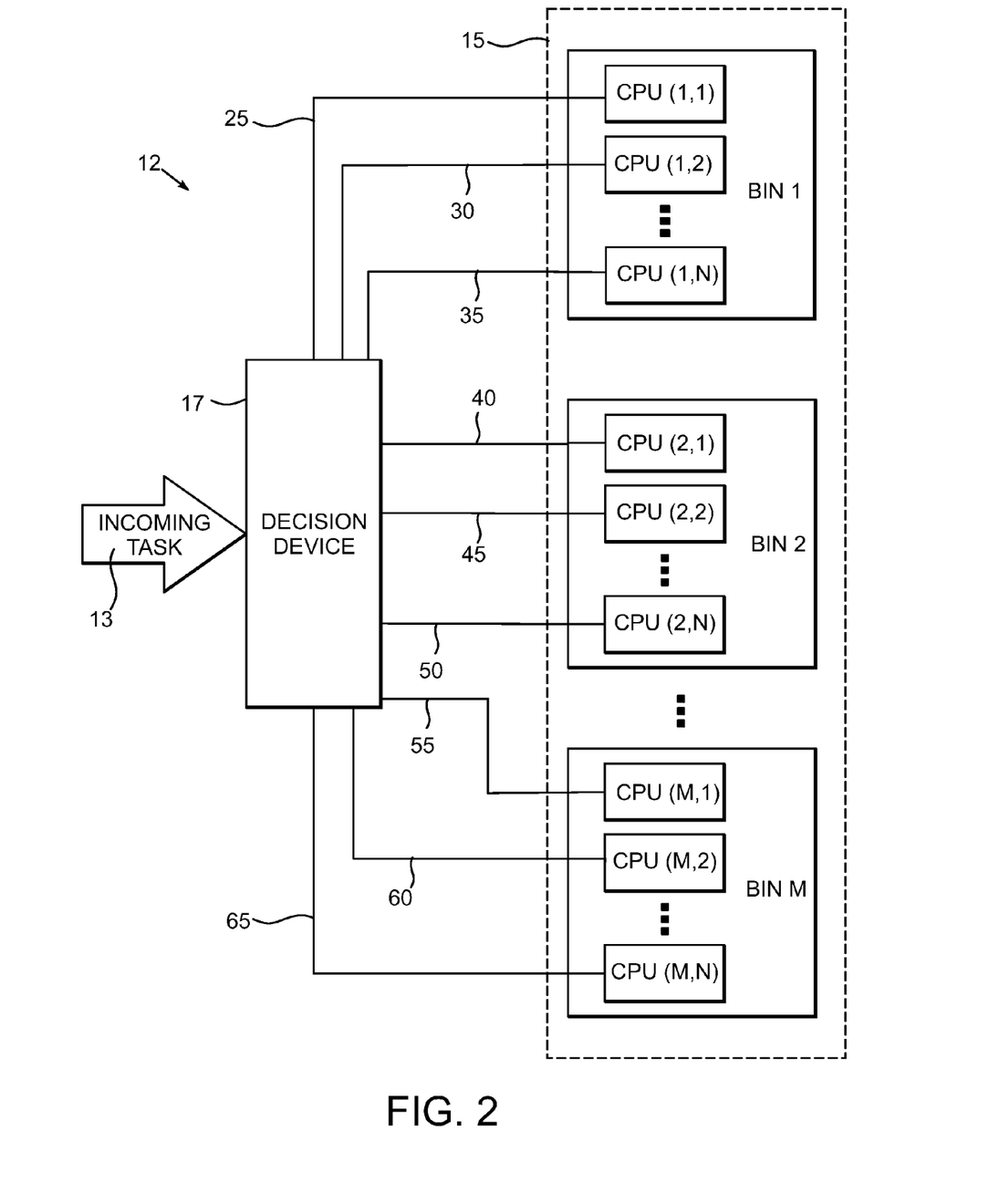
FIG. 2 is a schematic view of an exemplary embodiment of a remote computing system.
Figure 3:
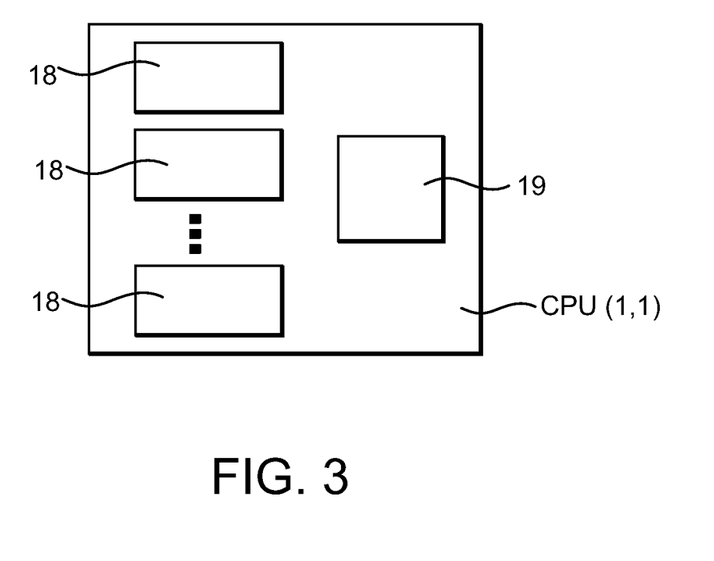
FIG. 3 is a schematic view of an exemplary processor.

Additional details of an exemplary embodiment of the remote computing system 12 will now be described in conjunction with FIG. 2, which is a schematic view. The remote computing system 12 may include a cluster 15 of plural processors logically connected to a DECISION DEVICE 20 by way of connections 25, 30, 35, 40, 45, 50, 55, 60 and 65, respectively, and organized into one or more performance bins BIN 1, BIN 2 ... BIN M. For the sake of simplicity at this stage, the processors are abbreviated "CPU" along with some numerical identifier, e.g., CPU (1,1), CPU (2,1) ... CPU (N,1) where the first digit represents the processor number and the second digit represents the performance bin number. The term "CPU" is used herein as an abbreviation for not only CPUs, but also processors and integrated circuits of other sorts, such as graphics processing units (GPUs), combined CPU/GPUs known as accelerated processing units (APUs), ASICs or other devices.

The various processors CPU (1,1) ... CPU (M,N) of the cluster 15 will typically have some default collection of available performance states that are a combination of core voltage and frequency. For example, certain varieties of an AMD Opteron® processor have five performance states based largely on frequency differences between 800 MHz and 2 GHz. Conversely, an example of an INTEL® core i7 processor has 14 performance states operating from 1.2 GHz to 2.8 GHz. These discrete power states may be hard wired into the processors at the fabrication stage or be capable of being set later by way of fuses and/or onboard registers that may be programmed by way of a BIOS or other system. For simplicity of description, assume that the processors CPU (1,1) ... CPU (M,N) may have three different performance states that are represented by Table 1 below.

TABLE 1

Available Processor Performance States

| Processor Performance State | Operating Voltage (volts) | Frequency (GHz) | Processor Power (watts) |
|---|---|---|---|
| 1 | 1.0 | 2.0 | 95 |
| 2 | 1.1 | 2.5 | 110 |
| 3 | 1.3 | 3.0 | 125 |

Thus, performance state 1 corresponds to a hypothetical operating voltage of 1.0 volts, a frequency of 2 GHz and a processor power of 95 watts. Processor power consumption for a given performance state may be proxied by thermal design power (TDP). Performance state 2 corresponds to 1.1 volts, 2.5 GHz and 110 watts, and performance state 3 corresponds to 1.3 volts, 3.0 GHz and 125 watts. These numerical examples are hypothetical but useful to illustrate the process described herein.

The definition of the performance bins BIN 1, BIN 2 ... BIN M will now be described in conjunction with FIG. 2. As just noted, the various processors CPU (1,1) ... CPU (M,N) of the cluster 15 will typically have some default collection of performance states that are a combination of core voltage and frequency. The plural processors CPU (1,1) ... CPU (M,N) are organized into plural performance bins BIN 1, BIN 2 ... BIN M, that are, in-turn categorized according to available processor performance state as shown in Table 2 below.

TABLE 2

| Performance BIN | Performance State |
|---|---|
| 1 | 1 |
| 2 | 2 |
| M | M |

Thus, BIN 1 is populated with plural processors CPU (1,1), CPU(2,1) ... CPU (N,1) at performance state 1, BIN 2 is populated with plural processors CPU (1,2), CPU (2,2) ... CPU (N,2) at performance state 2 and BIN M is populated with processors CPU (1,M), CPU (2,M) ... CPU (N,M) at performance state M. The bins BIN 1, BIN 2 ... BIN M need not be populated with the same number or type of processor(s). It should be understood that the performance bins BIN 1, BIN 2 ... BIN M are similar to logical address spaces. Thus, any of the processors CPU (1,1), CPU (2,1) ... CPU (N,1) for a given performance bin, say BIN 1, may be physically located in the same structure or be distributed among various computing devices as desired. The same is true for the other processors CPU (1,2), CPU (2,2) ... CPU (N,2) and CPU (1,M), CPU (2,M) ... CPU (N,M). The use of performance bins BIN 1, BIN 2 ... BIN M enables selective routing of particular tasks to a collection of processors in a particular performance bin in order to more efficiently utilize the overall population of the processors in the various bins BIN 1, BIN 2 ... BIN M. The decision device 20 is operable to accomplish these routing decisions by way of the plural connections. For example, schematically-represented connections 25, 30 and 35 connect the decision device 20 to the processors CPU (1,1), CPU (2,1) ... CPU (N,1), respectively.

Schematically-depicted connections 40, 45 and 50 similarly connect the decision device 20 to processors CPU (1,2), CPU (2,2) ... CPU (N,2), respectively, and schematically-depicted connections 55, 60 and 65 connect the decision device 20 to the processors CPU (1,M), CPU (2,M) ... CPU (N,M), respectively. The connections 25 through 65 may be wired, wireless or some combination thereof and may consist of any number of static and/or dynamic pathways that may or may not include intervening devices, such as a switches, other routers, servers, etc. The decision device 20 may be a processor, an ASIC, a computing system or other electronic device capable of receiving and routing the incoming task 13 to a CPU or CPUs of a performance bin, say BIN 1, that is appropriate for that particular task. In an exemplary embodiment, the decision device 20 can share functions with a datacenter cluster scheduler.

Typical examples of incoming tasks 13 traditionally known as "CPU-bound tasks" include cloud-based search queries and video coding and decoding, where such tasks tend to involve more CPU operations and less storage disk operations. Typical examples of incoming tasks 13 traditionally known as "I/O-bound tasks" include web-based email message processing or image retrieval, where such tasks tend to involve more storage disk operations and less CPU operations than CPU-bound tasks.

In order to classify an incoming task 13 and match it to an appropriate performance bin, e.g., BIN 1, the system 10, and more particularly the decision device 20, monitors various CPU performance counter metrics. The decision device 20 may include instructions stored in a computer readable medium in order to perform the activities described herein. At system startup, incoming tasks 13 may be routed using some conventional rules. However, shortly after startup, and as incoming tasks 13 continue to arrive, the system 10 continuously and over short time intervals obtains performance metrics that may be associated with a particular incoming task 13. The processors CPU (1,1) ... CPU (N,M) may include onboard logic to monitor one or more of the following parameters: number of unhalted cycles/second, number of retired instructions/second, last-level-cache references/second, last-level-cache misses/second, CPU load average, number of page faults/second, context switches/second and CPU migration/second to name just a few. The monitoring of one or more of these types of CPU performance counter metrics and mathematical manipulation thereof, may be done in a variety of ways. For example, models of CPU power versus various CPU performance counter metrics may be developed to quickly develop relationships between CPU power and performance counter metrics. These modeled values of CPU power may be mapped to the CPU power level i.e. performance states associated with the previously identified and characterized performance bins BIN 1, BIN 2 ... BIN M, etc. A variety of modeling techniques may be used. For example, a linear all parameter based model may be used with some or all of the above-listed parameters and linear regression techniques to yield a function that provides a value $P_{taskmodeled}$ of processor power for a given task as follows:

$$P_{taskmodelded} = f(a,b,c,d) \quad (1)$$

where (a, b, c, d) are the performance counter metrics used in the model. The function η(a, b, c, d) may be generated continuously and in near real time depending on the performance characteristics of the system. Thereafter, the value of modeled processor power $P_{taskmodeled}$ may be compared to the processor powers from Table 1 above. For example, assume that $P_{taskmodeled}$=105 watts. The closest larger value of processor power from Table 1 is 110 watts corresponding to performance state 2, so that particular modeled incoming task 13 (and future examples of it and others like it) will be assigned to performance BIN 2 and thus routed to those processors CPU (1,2), CPU (2,2) ... CPU (N,2) at performance state 2. A value of $P_{taskmodeled}$=90 watts would result in that particular incoming task 13 being assigned to performance BIN 1 and thus routed to the processors CPU (1,1), CPU (2,1) ... CPU (N,1) at performance state 1. The performance counter metrics may be polled periodically, but typically in short time intervals, since incoming tasks 13 may be arriving continuously and at great speeds.

The foregoing classification of tasks for routing to a particular performance bin is performed on a global basis, that is, on the cluster 15 as a whole. However, it may be desirable to enable local CPU governors 19 the option to manage performance states on a more localized basis. The local CPU governor may be able to react more quickly to short-term workload characteristics. Thus, a particular CPU governor 19 may be operable to lower a performance state of a particular processor in circumstances where the local CPU governor 19 determines that the performance state of a given processor may be lower without adversely impacting through-put and other performance characteristics. This feature enables a greater level of granularity with regard to power savings by way of localized processor management.

Figure 4:
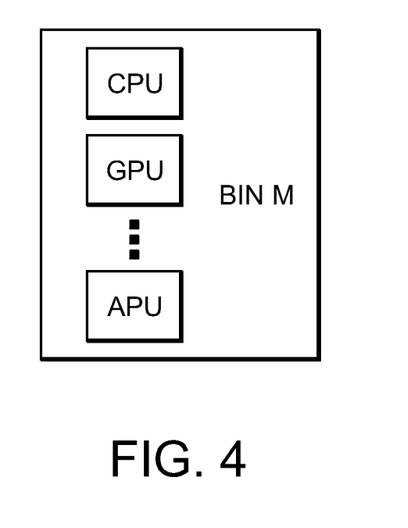
FIG. 4 is a schematic view of an alternate exemplary processor performance bin.

The integrated circuits that populate a given performance bin, such as BIN M, may be any of a variety of different types of processor types. For example, and as shown in FIG. 1, the processors CPU (1,M), CPU (2,M) ... CPU (N,M) of BIN 1 may all be CPUs. However, and as shown in FIG. 4, an alternative performance BIN M may be populated with a CPU, a graphics processing unit (GPU) and a so-called accelerated processing unit or APU, which combines aspects of a microprocessor and a graphics processor. Considerable flexibility in grouping various processors is envisioned.

Additional monitoring by the system 10 may be performed over longer time intervals to readjust as necessary the populations of CPUs in the various performance bins BIN 1, BIN 2 ... BIN M. For example, the system 10 may determine that the majority of incoming tasks 13 over some time interval can and should be appropriately handled by processors in performance BIN 1. In that circumstance, the system 10 may reassign one more processors from BIN 2 or BIN M to BIN 1. Reassigning a processor, such as CPU (2,1), to a different performance bin will typically require the system 10 to alter the performance state of the processor CPU (2,1), say from state 2 to state 1, via DVFS or otherwise. This process of monitoring incoming tasks 13 and adjusting performance bin populations may be performed on a continuous basis. Bin processor population adjustment can be up or down.

In addition, the system 10 is operable to readjust the performance state of a given performance bin, such as BIN M, as necessary to adjust to differing computing conditions. For example, the system 10 may monitor incoming tasks 13 and determine that over some longer interval, all of the incoming tasks 13 require processor power than state M of performance BIN M. In this circumstance, the system 10 can redefine the performance state of BIN M to a lower level. This should improve task execution. Bin performance state redefinition can be up or down.

It should be understood that processor assignment to given performance bin BIN 1, BIN 2 ... BIN M and routing of incoming tasks 13 could be accomplished on a per-core basis. Thus, a processor with 12 cores could have some cores assigned to BIN 1 and others to BIN M. Incoming tasks could be assigned to the BIN 1 cores and others to the BIN M cores.

Figure 5:
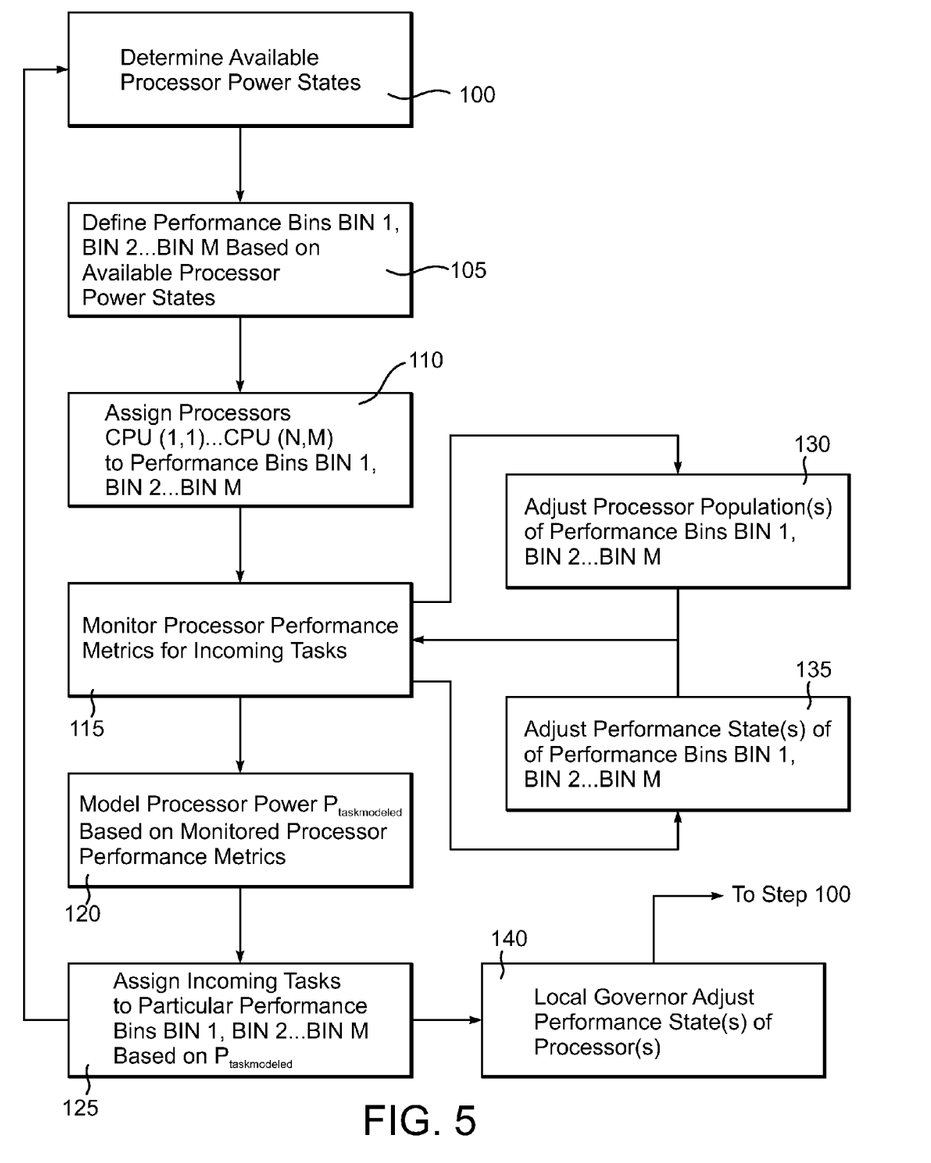
FIG. 5 is a schematic flow chart of an exemplary method of operating the distributed computing system.

An exemplary control loop using performance bins is depicted in flow chart form in FIG. 5. Referring now to FIGS. 2 and 5, at step 100, the system 10 determines the available processor power states. As noted above, the system 10 may poll the available processors CPU (1,1) . . . CPU (N,M) at system start up or at some other time to determine the available power states. At step 105, the system 10 defines performance bins BIN 1, BIN 2 . . . BIN M based on the available processor power states 105. At step 110, the system 10 assigns the processors CPU (1,1) . . . CPU (N,M) to the various performance bins BIN 1, BIN 2 . . . BIN M. At step 115, the system 10 monitors processor performance metrics for incoming tasks 13. This process may involve polling the various processors to obtain data from the processors CPU (1,1) . . . CPU (N,M)s' on-board performance metric counters. At step 120, the processor power $P_{taskmodeled}$ is modeled based on the monitored processor performance metrics from step 115. At step 125, incoming tasks are assigned to particular performance bins BIN 1, BIN 2 . . . BIN M based on the model processor power $P_{taskmodeled}$. Concurrently, although based on somewhat longer timer intervals, at step 130 the system may adjust processor populations of the performance bins BIN 1, BIN 2 . . . BIN M based on the monitor processor performance metrics for incoming tasks at step 115. Similarly, at step 135, the system 10 may adjust the performance states of one or all of the performance bins BIN 1, BIN 2 . . . BIN M based on the monitored processor performance metrics. Step 125 may return to step 100 as desired. Similarly, steps 130 and 135 may return to step 115 as desired. If local governor override control is enabled, then at step 140, the local governor 19 for a given processor CPU (1,1) . . . CPU (N,M) may adjust the performance state of that processor based on local workload sensing. Step 140 may return to step 100.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of computing, comprising:
    defining plural processor performance bins, each processor performance bin having a processor performance state, each processor performance state including a processor power state;
    assigning at least one processor to each of the plural processor performance bins;
    monitoring processor performance metrics of at least one of the processors while the at least one of the processors executes a task;
    modeling processor power based on the monitored performance metrics to generate an expression of modeled processor power as a function of the monitored performance metrics for the task; and
    assigning future incoming tasks that are identical or similar to the task to one or more of the processors in the processor performance bin having the processor power state that is greater than or equal to the modeled processor power.

2. The method of claim 1, wherein each of the processors includes a local governor, the method comprising enabling the local governor to lower a power state of its corresponding processor.

3. The method of claim 1, comprising polling each processor to determine its available power states and defining the plural processor performance bins based on the polled available power states.

4. The method of claim 1, wherein the processors comprise a cluster.

5. The method of claim 1, wherein the processors comprise a CPU, a GPU or an APU.

6. The method of claim 1, comprising reassigning one or more of the processors to a different processor performance bin.

7. The method of claim 1, comprising redefining one or more of the processor performance bins based on different processor performance states.

8. A method of computing, comprising:
    receiving at a remote computing system a task from a local computing device, the remote computing system having plural processors, plural defined processor performance bins, each processor performance bin having a processor performance state, each processor performance state including a processor power state, at least one processor being assigned to each of the plural processor performance bins;
    monitoring processor performance metrics of at least one of the processors while the at least one of the processor executes the task;
    modeling processor power based at least in part on the monitored performance metrics to generate an expression of modeled processor power as a function of the monitored performance metrics for the task; and
    assigning future incoming tasks that are identical or similar to the task to one or more of the processors in the processor performance bin having the processor power state that is greater than or equal to the modeled processor power.

9. The method of claim 8, wherein the local computing device comprises a handheld mobile, a personal computer or a smart television.

10. The method of claim 8, wherein the remote computing system comprises a processor cluster.

11. The method of claim 8, wherein each of the processors includes a local governor, the method comprising enabling the local governor to lower a power state of its corresponding processor.

12. The method of claim 8, comprising polling each processor to determine its available power states and defining the plural processor performance bins based on the polled available power states.

13. The method of claim 8, wherein one or more of the processors comprise a CPU, a GPU or an APU.

14. A computing system, comprising:
    a decision device operable to define plural processor performance bins, each processor performance bin corresponding to one of multiple processor performance states, each processor performance state including a processor power state;
    plural processors coupled to the decision device, each processor having the multiple processor performance states; and
    whereby the system includes instructions in a computer readable medium for assigning at least one processor to each of the plural processor performance bins, monitoring processor performance metrics of at least one of the processors while the at least one of the processors executes a task and model processor power based on the monitored performance metrics to generate an expression of modeled processor power as a function of the monitored performance metrics for the task, and assigning future incoming tasks that are identical or similar to the task to one or more of the processors in the processor performance bin having the processor power state that is greater than or equal to the modeled processor power.

15. The computing system of claim 14 wherein each of the processors includes a local governor operable to lower a power state of its corresponding processor.

16. The computing system of claim 14, wherein the processors comprise a cluster.

17. The computing system of claim 14, wherein one or more of the processors comprise a CPU, a GPU or an APU.

* * * * *